C. W. NUSS.
DRAFT EQUALIZERS.
No. 181,707.  Patented Aug. 29, 1876.
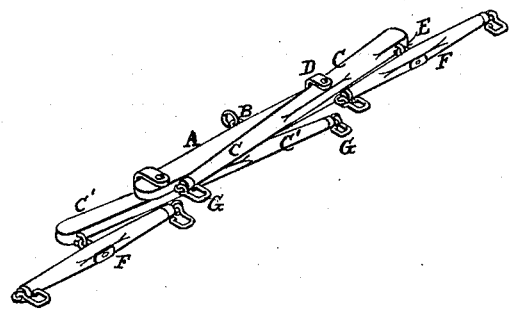
ATTEST:
Robt Burns.
Charles Pickles
INVENTOR:
Charles W. Nuss
By Knight Bro.
Attys.

UNITED STATES PATENT OFFICE.

CHARLES W. NUSS, OF COLOMA, MISSOURI.

IMPROVEMENT IN DRAFT-EQUALIZERS.

Specification forming part of Letters Patent No. 181,707, dated August 29, 1876; application filed May 24, 1875.

*To all whom it may concern:*

Be it known that I, CHARLES W. NUSS, of Coloma, Carroll county, State of Missouri, have invented a certain new and useful Improvement in Three-Horse Equalizers, of which the following is a specification:

My improvement has a bar whose center is attached to the draft-clevis, and which is the equivalent of the ordinary double-tree. To each end of this bar is pivoted a lever, the one upon the top of the bar, and the other at the bottom, so as to give an equal draft upon both sides of the bar. The fulcrum-pivots of these levers are placed at one-third their length from the outer end. The single-trees for the two outside horses are secured to the outer ends of these bars or levers, and the traces of the middle horse are directly attached to the inner ends, without the intervention of a single-tree.

The drawing is a perspective view of my improvement.

A is a bar, occupying the place of an ordinary double-tree, its central clip B being secured to the clevis of the plow or other object to be drawn. C is a bar or lever above the bar A, and pivoted at the point D to the end of bar A. The fulcrum-point D is one-third the length of the bar from the outer end of the bar. E is the clip at the outer end of the bar C, to which the single-tree F (for one of the outer horses) is secured. The longer (or inner) end of the equalizer bar or lever C carries a hook, G, to which a single trace of the middle horse is directly attached, (without the intervention of a single-tree.) The equalizer bar or lever C′ is, in all respects, a counterpart of that C, but it is placed beneath the bar A, instead of being, like that C, above it. Thus the draft upon the bar A is equal at the upper and lower side. This arrangement also allows of the equalizer-levers oscillating without striking one against the other.

Some of the advantages possessed by this three-horse equalizer over those in common use are as follows: It is lighter and more compact, and brings the team nearer to the plow; (indeed, the team is no farther from the plow than with the common two-horse double-tree;) it dispenses with one single-tree; it will not drag or become entangled in turning, as the hooks will not interfere; the cost of manufacture is very light.

I claim as my invention—

The combination of the removable bar A, for direct attachment to the draft-clevis, and equalizing-bars C C′, attached to the bottom and top of the bar A, respectively, as described, carrying at the outer end E a single-tree, and at the inner end a hook, or equivalent device, for direct attachment of the harness-trace, substantially as set forth.

CHARLES W. NUSS.

Witnesses:
 CHARLES L. LEVAN,
 THOMAS B. BEACH.